United States Patent [19]

Meister, deceased

[11] Patent Number: 4,531,540
[45] Date of Patent: Jul. 30, 1985

[54] SERVOCONTROLLED PRESSURE LIMITING VALVE

[75] Inventor: Erwin Meister, deceased, late of Oensingen, Switzerland, by Margrith Meister-Beck, heir

[73] Assignee: Von Roll Hydraulik AG, Oensingen, Switzerland

[21] Appl. No.: 494,319

[22] Filed: May 13, 1983

[30] Foreign Application Priority Data

May 19, 1982 [CH] Switzerland .................. 3131/82

[51] Int. Cl.³ ............................................. F16K 31/36
[52] U.S. Cl. .................................. 137/492.5; 137/489
[58] Field of Search ................... 137/488, 489, 492.5

[56] References Cited

U.S. PATENT DOCUMENTS 2,612,019  9/1952  Halferd et al. ................. 137/488
3,060,951 10/1962  Audemar ....................... 137/488
3,238,966  3/1966  Howard et al. ................. 137/488
4,000,754  1/1977  Risk ............................ 137/492.5

FOREIGN PATENT DOCUMENTS 364671 11/1962 Switzerland .

Primary Examiner—Ronald C. Capossela
Attorney, Agent, or Firm—Roylance, Abrams, Berdo & Goodman

[57] ABSTRACT

A pressure limiting valve has two pipe connections connectable to pipes at different pressures and a main piston axially movable in a sleeve in a housing. One end of the piston is closed and the other, free end is attached to an annular piston having two oppositely facing annular surfaces. One annular surface is exposed to the higher pressure through a fluid circuit portion including a changeover valve and the other annular surface is exposed to the pressure at one of the connections. The interior of the main piston is exposed to the lower pressure through a fluid circuit portion including a servocontrol valve. The resulting structure is a double-acting limiting valve having a very low mass piston and high response sensitivity.

8 Claims, 2 Drawing Figures

SERVOCONTROLLED PRESSURE LIMITING VALVE

This invention relates to a servocontrolled pressure limiting valve for use in pressurized fluid pipes, the valve being provided with two pipe connections and arranged such that either can form the feed side or the drain side.

BACKGROUND OF THE INVENTION

Servocontrolled pressure limiting valves are widely used in the distribution of pressurized fluid whenever it is necessary to rapidly drain off relatively large quantities of fluid when the pressure exceeds a predetermined level. Such valves, also known as pilot-operated valves, essentially comprise a main piston and a pilot or servocontrol valve associated with the main piston, the servocontrol valve being a relatively small, directly acting pressure responsive valve. The smaller valve opens when the predetermined pressure is exceeded, thereby relieving one face of the main piston and, as a result of the fluid pressure differential, the main piston is moved in the opening direction. Although such servocontrolled pressure reducing valves are used in large numbers and operate reliably when properly maintained, the main piston tends to be quite heavy, particularly when the valve is a large size valve, so that a large mass must be accelerated at the moment of opening, and this has a detrimental effect on the opening time.

The weight of the main piston can be reduced if a cartridge type of pressure limiting valve is used. In such a valve, the main piston is constructed so as to have a hollow, cup shape which results in a considerable reduction in the mass of the piston. The advantage of this construction is particularly apparent when this valve is used as a single-acting pressure limiting valve wherein the feed side, i.e., the higher pressure side, is closed by the bottom of the cup-shaped main piston. In single-acting pressure limiting valves, this surface can be constructed in such a way that it is only slightly smaller than the total surface of the main piston which means that the valve immediately responds in response to only a small pressure reduction on the side of the main piston opposite the bottom. The smaller mass of the main piston and the lower pressure differential required to make the main piston operate ensures that the valve responds somewhat more rapidly than in the case of a solid piston. If such cartridge-type valves are used in fluid systems in which the pressure side alternates, so that a higher pressure can occur at either pipe connection, a second valve must be provided for the other pressure side because such a valve can only respond to one pressure side. This represents a relatively large expenditure.

Thus, solutions have been sought for the purpose of providing a single valve which can respond to high pressure at either side. In one such known structure, shown in Swiss Pat. No. 364,671, the cup-shaped main piston has a bottom surface to which is connected one pipe connection and, outside the bottom surface, the piston has a second annular surface associated with the second pipe connection. Because it is to operate as a servocontrolled valve, it is necessary to control the operation in such a way that the servocontrolled valve is always coupled to the pipe connection in which the higher pressure prevails. In the known valve, this is achieved by providing two check valves in the main piston, one of the check valves being connected in each case to one of the two pipe connections. Thus, the check valve which is at the higher pressure is open and the other is closed.

Although this arrangement solves the aformentioned problem of providing two pressure responsive sides with a single valve, it leads to the disadvantage that both the bottom surface and the annular surface of the main piston are smaller than the total surface of the piston. If, for example, the two partial surfaces are of the same size, the total surface of the piston is doubled. Since, however, the response of the main piston occurs as a result of the pressure on one of the partial surfaces, there must be a relatively large pressure differential before the main piston responds. However, because the diameter of the main piston corresponding to the two partial surfaces is larger than for the single-acting valve, the piston mass is noticeably increased, again slowing down the opening process.

BRIEF SUMMARY OF THE INVENTION

Accordingly, an object of the present invention is to provide a pressure limiting valve capable of responding to pressure differentials in either direction in a pipe wherein rapid response is maintained in the same way as in a single-acting valve, even though the valve is used as a double-acting valve.

Briefly described, the invention comprises a servocontrolled pressure limiting valve of the type having a housing with two pipe connections either of which can be used as the inlet connection with the other being the drain connection, a cup-shaped main piston in the housing having a free end and having a bottom end opposite the free end with the bottom end exposed to the pressure at one of the connections, and a fluid circuit including a pressure limiting valve coupled to the higher pressure one of the pipe connections, wherein the improvement comprises an annular piston in said housing fixedly attached to the free end of said main piston, said annular piston having two annular, generally oppositely directed surfaces.

Because of the fact that the main piston remains substantially unchanged and is merely supplemented by an annular piston, which can also be kept very short because the guidance is accomplished by the main piston, one is assured that the pressure surface of the pipe connection and the surface of the main piston facing the servo valve can be of approximately equal size, independent of the particular pipe connection at which the higher pressure prevails. Due to the at least approximate equality of the decisive surfaces on the main piston and, because of the only slight increase in its mass, the response speed of such a double-acting pressure limiting valve is comparable with that of a single-acting valve constructed in cartridge-like manner.

In order that the manner in which the foregoing and other objects are attained in accordance with the invention can be understood in detail, particularly advantageous embodiments thereof will be described with reference to the accompanying drawings, which form a part of this specification and wherein.

DETAILED DESCRIPTION OF THE PREFERRED EMBODIMENTS

Figure 1:
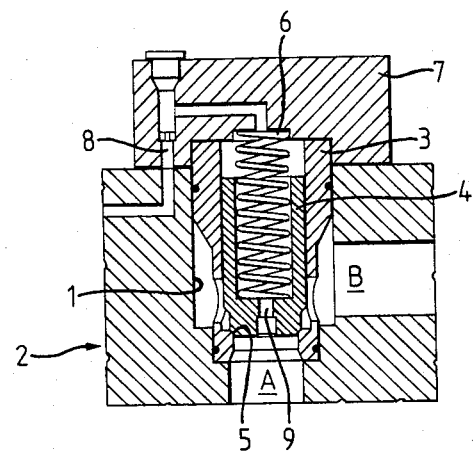
FIG. 1 is a side elevation, in section, of a cartridge-type valve.

FIG. 1 shows a cartridge-type, single-acting valve, constructed to be connected to two pipes at the two pipe connections A, B. The valve structure includes a housing indicated generally at 2, a bore 1 in the housing and a sleeve 3 fixedly mounted in the bore. A valve piston 4 is slidably received within sleeve 3, one end of piston 4 being shaped and dimensioned to cooperate with a valve seat 5 formed on the inside at one end of sleeve 3. A compression coil spring 6 is received within piston 4 to urge the piston toward its closed position against valve seat 5. Bore 1 is closed by a cover plate 7 which is provided with a channel forming a servocontrol line 8 which interconnects the interior of valve piston 4 with a servo valve or some other form of control device, not shown. A small diameter bore 9 is provided through the bottom end valve piston 4 and provides communication between the pipe connection A with the interior of valve piston 4 and, consequently, with the servocontrol valve through line 8. As will be recognized, if the pressure at pipe connection A rises above the pressure for which the servo valve or control device is set, that control device opens, permitting the pressure within piston 4 to drop and permitting the valve piston to be forced open by the greater pressure at connection A. Closing spring 6 is a relatively weak spring having substantially no influence on the opening process, the spring functioning merely to close the valve when there is no pressure differential.

It can be seen from FIG. 1 that this valve can only respond to a higher pressure at pipe connection A. Pipe connection B is not connected to the servocontrol system so that there can be no response of the valve as a function of the pressure at connection B. It is important that, in the structure according to FIG. 1, the surface of valve piston 4 at connection A can be made to be substantially the same size as the diameter of the entire valve piston 4 within sleeve 3.

Figure 2:
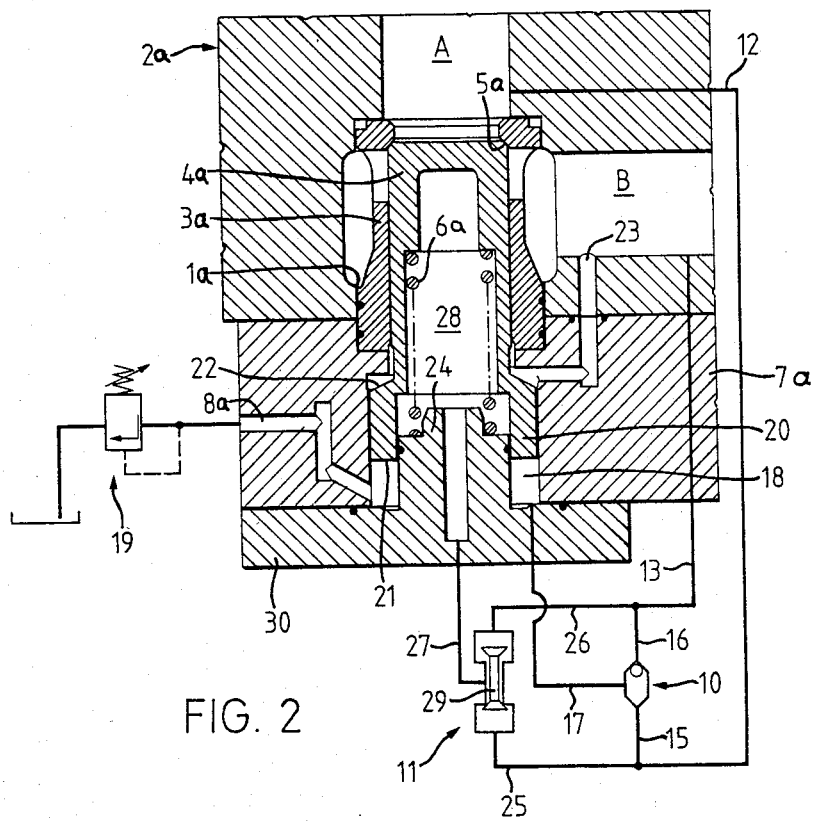
FIG. 2 is a side elevation, in section, of a double-acting servocontrolled pressure limiting valve in accordance with the invention with a servo valve, change-over valve and reversing valve illustrated in schematic form in a fluid circuit.

FIG. 2 shows a pressure limiting valve which is constructed as a double-acting valve and, in FIG. 2, those parts which are analogous to the components of FIG. 1 are identified with the same reference numerals followed by the letter "a". It will be recognized that there is substantial similarity between some components of the structures of FIGS. 1 and 2, and the description of those components will be repeated.

In order that the valve of FIG. 2 always responds when a higher pressure exists in one of the two pipe connections A, B, a changeover valve 10 and a servocontrolled reversing valve 11 are provided. Pipe connection A is connected through a line 12 and pipe connection B through a line 13 to opposite ends of changeover valve 10 and reversing valve 11. Valve 10 can be constructed, for example, as a bidirectional check valve with two supply lines 15, 16 and a drain line 17. In FIG. 2, changeover valve 10 is represented as having responded to a higher pressure in feed line 15 so that the valve cone or ball is pressed against the opening to feed line 16 and closes the latter, coupling feed line 15 to drain line 17 which empties into an annular space 18. From that space, the servocontrol line 8a is connected to a servocontrol or pilot valve 19, symbolically shown. This valve can be constructed, for example, as a sring-loaded valve cone which rests on a valve seat and blocks line 8a. Thus, if the pressure exceeds a predetermined pressure established by the spring, the valve opens, permitting the pressure in the annular space 18 to drop, recognizing that connecting lines 12, 13 to pipe connections A, B are restricted in an appropriate manner, e.g., by conventional restrictors, not shown.

It is important also that the cup-shaped valve piston 4a be connected at its free end with an annular piston 20 which forms two annular surfaces 21, 22. The internal diameter of annular piston 20 can be the same as the external diameter of valve piston 4a, and the area of annular surfaces 21 and 22 can be the same as each other. Annular surface 22 is directly connected to pipe connection B via line 23.

The opening through cover plate 7a is sealed by a cover plate 30 which has an inwardly projecting member 24 forming the inner wall of annular space 18 for annular piston 20.

The servocontrolled changeover valve 11 has two supply lines 25 and 26 and a drain line 27 which is connected to the inner space 28 of valve piston 4a. The reversing valve has a function which is opposite to that of the changeover valve 10 because the higher pressure in one of the two feed lines 25, 26 controls the double valve body in such a way that the feed line with the lower pressure is connected to the drain line 27. This means that inner space 28 is always connected to the one of pipe connections A, B in which the lower pressure prevails, this being always essentially the same as atmospheric pressure or a few bars above it. However, due to the function of changeover valve 10, annular space 18 is always connected to the one of pipe connections A, B in which the higher pressure prevails.

If connection A has the higher pressure, changeover valve 10 is moved to the position shown in FIG. 2 so that there is a connection between feed line 15 and drain line 17, and therefore, with annular space 18. If the pressure in pipe connection A rises to a pressure above that set in servocontrol valve 19, the latter opens and causes the opening of valve piston 4a, the pressurized fluid then flowing to pipe connection B. If the higher pressure prevails in pipe connection B, valve 10 closes feed line 15 and connects line 16 with drain line 17 and with space 18. Simultaneously, the double valve body 29 in reversing valve 11 is moved into the opposite position from that shown in FIG. 2, i.e., with feed line 26 blocked and feed line 25, having the lower pressure, connected to feed line 27 and to inner space 28 of valve piston 4a.

The addition of annular piston 20 only represents a slight increase in the mass of valve piston 4a because its overall height need not be significantly greater than the axial travel distance of valve piston 4a. It is also possible, without difficulty, to make the bottom surface of valve piston 4a, which is directed toward pipe connection A, the same size as the two annular surfaces 21, 22 which then leads to a high response sensitivity.

The valve according to FIG. 2 has been described as a double-acting pressure limiting valve. It is possible with such a valve to act in an equivalent fashion against two pressure sides of, for example, a hydrostatic circuit, that is, limit them to the same pressure. Flow takes place either from pipe connection A to pipe connection B or vice versa. If the servocontrol valve 19 in the above-described valve is replaced by a manually or automatically operated bypass valve, the valve can be used as a no-load valve, interconnecting the two pipe connections A, B in an approximately pressureless manner.

While certain advantageous embodiments have been chosen to illustrate the invention, it will be understood by those skilled in the art that various changes and modifications can be made therein without departing from the scope of the invention as defined in the appended claims.

What is claimed is:

1. A servocontrolled pressure limiting valve for controlling pressure in two pressure lines, comprising:
    a housing having first and second connections selectively forming drain and inlet ports;
    a main valve piston mounted in said housing and having opposite first and second ends, said first end including a first end face in fluid communication with said first connection, said valve piston having a first annular face between said ends connected by a line to said second connection;
    an annular piston fixed on said second end of said valve piston, said annular piston including a second annular face opposite to said first annular face;
    an annular cylinder space in said housing adjacent said second end of said valve piston, said cylinder space defined on one side by said second annular face;
    a pilot-operated valve in fluid communication with said cylinder space;
    fluid circuit means, coupled to said housing, for alternatively connecting said first and second connections to said cylinder space in fluid communication, said fluid circuit means including a shuttle valve connected by lines to said first and second connections; and
    an inner space in said valve piston vented to relatively low pressure.

2. A servocontrolled pressure limiting valve according to claim 1 wherein a pressure-operated reversing valve means is coupled by conduits to said first and second connections for connecting said connection at a lower pressure to said inner space to vent said inner space.

3. A servocontrolled pressure limiting valve according to claim 2 wherein said first end face comprises a first surface area; and said first and second annular faces comprise second and third surfaces areas, respectively, each of said surfaces areas being substantially equal.

4. A servocontrolled pressure limiting valve according to claim 1 wherein said first end face comprises a first surface area; and said first and second annular faces comprise second and third surfaces areas, respectively, each of said surfaces areas being substantially equal.

5. A servocontrolled pressure limiting valve according to claim 1 wherein a closing spring is mounted in said inner space biasing said piston valve toward a closed position.

6. A servocontrolled pressure limiting valve according to claim 1 wherein said valve piston is cup-shaped with a closed end thereof forming said first end.

7. A servocontrolled pressure limiting valve according to claim 1 wherein said fluid circuit means connects said connection at a higher pressure to said cylinder space.

8. A servocontrolled pressure limiting valve according to claim 2 wherein said fluid circuit means connects said connection at a higher pressure to said cylinder space.

* * * * *